US009902829B2

(12) United States Patent
Nordin

(10) Patent No.: US 9,902,829 B2
(45) Date of Patent: Feb. 27, 2018

(54) MICROSPHERES

(71) Applicant: Akzo Nobel Chemicals International B.V., Amersfoort (NL)

(72) Inventor: Ove Nordin, Kvissleby (SE)

(73) Assignee: Akzo Nobel Chemicals International B.V., Arnhem (NL)

( * ) Notice: Subject to any disclaimer, the term of this patent is extended or adjusted under 35 U.S.C. 154(b) by 0 days.

(21) Appl. No.: 14/402,958

(22) PCT Filed: May 27, 2013

(86) PCT No.: PCT/EP2013/060818
§ 371 (c)(1),
(2) Date: Nov. 21, 2014

(87) PCT Pub. No.: WO2013/178561
PCT Pub. Date: Dec. 5, 2012

(65) Prior Publication Data
US 2015/0322226 A1 Nov. 12, 2015

Related U.S. Application Data

(60) Provisional application No. 61/652,945, filed on May 30, 2012.

(30) Foreign Application Priority Data

May 30, 2012 (EP) ..................... 12169975

(51) Int. Cl.
| C08J 9/20 | (2006.01) |
| B01J 13/18 | (2006.01) |
| B01J 13/14 | (2006.01) |
| B29C 67/24 | (2006.01) |
| C08J 9/32 | (2006.01) |
| B29C 70/66 | (2006.01) |

(52) U.S. Cl.
CPC .......... *C08J 9/20* (2013.01); *B01J 13/14* (2013.01); *B01J 13/18* (2013.01); *B01J 13/185* (2013.01); *B29C 67/247* (2013.01); *B29C 70/66* (2013.01); *C08J 9/32* (2013.01); *C08J 2203/22* (2013.01); *C08J 2333/26* (2013.01); *C08J 2433/22* (2013.01); *C08J 2433/26* (2013.01); *Y10T 428/2982* (2015.01)

(58) Field of Classification Search
None
See application file for complete search history.

(56) References Cited

U.S. PATENT DOCUMENTS

| 3,615,972 A | 10/1971 | Morehouse et al. |
| 3,945,956 A | 3/1976 | Garner |
| 4,287,308 A | 9/1981 | Nakayama et al. |
| 5,536,756 A | 7/1996 | Kida et al. |
| 6,235,394 B1 | 5/2001 | Shimazawa et al. |
| 6,235,800 B1 | 5/2001 | Kyuno et al. |
| 6,509,384 B2 | 1/2003 | Kron et al. |
| 6,617,363 B2 | 9/2003 | Ohmura et al. |
| 6,984,347 B2 | 1/2006 | Masuda et al. |
| 2004/0176486 A1 | 9/2004 | Glorioso et al. |
| 2005/0079352 A1 | 4/2005 | Glorioso et al. |
| 2007/0208093 A1 | 9/2007 | Nordin et al. |
| 2007/0287776 A1 | 12/2007 | Nordin et al. |
| 2008/0017338 A1 | 1/2008 | Nordin et al. |
| 2009/0292031 A1* | 11/2009 | Ejiri ............... C08F 220/06 521/56 |
| 2010/0180995 A1 | 7/2010 | Teratani et al. |

FOREIGN PATENT DOCUMENTS

| EP | 0348372 A2 | 12/1989 |
| EP | 0486080 A2 | 5/1992 |
| EP | 1230975 A1 | 8/2002 |
| EP | 1288272 A1 | 3/2003 |
| EP | 1508604 A1 | 2/2005 |
| EP | 1577359 A1 | 9/2005 |
| EP | 1598405 A1 | 11/2005 |
| EP | 1811007 A1 | 7/2007 |
| EP | 1964903 A1 | 9/2008 |
| EP | 2336226 A1 | 6/2011 |
| EP | 2360221 A1 | 8/2011 |
| EP | 2529830 A2 | 12/2012 |
| JP | S62-286534 A | 12/1987 |
| JP | 2005-272633 A | 10/2005 |
| WO | 02/096635 A1 | 12/2002 |
| WO | 2004/056549 A1 | 7/2004 |
| WO | 2004/072160 A1 | 8/2004 |
| WO | 2006/009643 A2 | 1/2006 |

(Continued)

OTHER PUBLICATIONS

Notification of Transmittal of the International Search Report and the Written Opinion of the International Searching Authority, or the Declaration from the International Bureau of WIPO for International Application No. PCT/EP2013/060818 dated Dec. 19, 2013.
Search Report of EP12169975.5 dated Apr. 9, 2013.

*Primary Examiner* — Jeffrey Washville
(74) *Attorney, Agent, or Firm* — McDonnell Boehnen Hulbert & Berghoff LLP

(57) ABSTRACT

The present invention relates to thermally expandable thermoplastic microspheres comprising a polymer shell made from ethylenically unsaturated monomers encapsulating a propellant, said ethylenically unsaturated monomers comprising from 21 to 80 wt % of methacrylamide and from 20 to 70 wt % methacrylonitrile, the total amount of methacrylamide and methacrylonitrile being from 70 to 100 wt % of the ethylenically unsaturated monomers. Furthermore, the invention relates to production and use of such microspheres.

17 Claims, No Drawings

(56) References Cited

FOREIGN PATENT DOCUMENTS

| WO | 2007/073318 A1 | 6/2007 |
| WO | 2007/091960 A1 | 8/2007 |
| WO | 2007/091961 A1 | 8/2007 |
| WO | 2007/142593 A1 | 12/2007 |
| WO | 2010/038615 A1 | 4/2010 |
| WO | 2010/052972 A1 | 5/2010 |
| WO | 2010/143512 A1 | 12/2010 |
| WO | 2011/013499 A1 | 2/2011 |
| WO | 2013/178561 A2 | 12/2013 |

* cited by examiner

MICROSPHERES

This application is a national stage filing under 35 U.S.C. §371 of PCT/EP2013/060818, filed May 27, 2013, which claims priority to European Patent Application No. 12169975.5, filed May 30, 2012, and U.S. Provisional Patent Application No. 61/652,945, filed on May 30, 2012, the contents of which are incorporated herein by reference in their entirety.

The present invention relates to thermally expandable thermoplastic microspheres, its production and use.

BACKGROUND OF THE INVENTION

Expandable thermoplastic microspheres comprising a thermoplastic polymer shell encapsulating a propellant are commercially available under the trademark EXPANCEL® and are used as a foaming agent in many different applications.

In such microspheres, the propellant is normally a liquid having a boiling temperature not higher than the softening temperature of the thermoplastic polymer shell. Upon heating, the propellant evaporates to increase the internal pressure at the same time as the shell softens, resulting in significant expansion of the microspheres. The temperature at which the expansion starts is called $T_{start}$, while the temperature at which maximum expansion is reached is called $T_{max}$. Expandable microspheres are marketed in various forms, e.g. as dry free flowing particles, as an aqueous slurry or as a partially dewatered wet-cake.

Expandable microspheres can be produced by polymerising ethylenically unsaturated monomers in the presence of a propellant. Usually the monomers mainly comprise monomers with one carbon-to-carbon double bond together with small amounts of cross-linking monomers having two or more carbon-to-carbon double bonds. Detailed descriptions of various expandable microspheres and their production can be found in, for example, U.S. Pat. Nos. 3,615,972, 3,945,956, 4,287,308, 5,536,756, 6,235,800, 6,235,394 and 6,509,384, 6,617,363 and 6,984,347, in US Patent Applications Publications US 2004/0176486 and 2005/0079352, in EP 486080, EP 1230975, EP 1288272, EP 1598405, EP 1811007 and EP 1964903, in WO 2002/096635, WO 2004/072160, WO 2007/091960, WO 2007/091961 and WO 2007/142593, and in JP Laid Open No. 1987-286534 and 2005-272633.

One important application for expandable microspheres is as a foaming agent for processing of polymeric materials, for example in injection moulding and extrusion moulding. In some cases it is desirable to have microspheres with a high expansion temperature in combination with high thermo stability after expansion, for example when microspheres are processed together with a polymer at high temperatures during a long time period. It is also desirable to have microspheres with a broad expansion window so that the microspheres can be used at different temperatures without having to reformulate the microsphere composition during processing. This would give the end user of the microspheres more freedom to design the process conditions when optimizing the foaming of a certain material.

EP 1508604, EP 1577359 and EP 1964903 disclose microspheres having high expansion temperature that are made by including significant amounts of methacrylic acid monomers in the polymer shell.

Even though microspheres with high expansion temperature can be obtained, methacrylic acid monomers render the production process complicated. For example, methacrylic acid is highly water soluble and the process conditions requires low pH, large amounts of salt in the water phase and water soluble inhibitors to prevent agglomerates and lumps in the polymerization slurry. Low pH and salt can cause problems with corrosion in the polymerization reactors. High amounts of salt also require a higher water phase/organic phase ratio in order to be able to dissolve the salt, lowering the amount of microspheres produced per batch.

It is an object of the invention to provide expandable microspheres with high expansion temperature.

It is another object of the invention to provide expandable microspheres with a broad expansion window.

It is yet another object of the invention to provide expanded microspheres having excellent volume retention at high temperature.

BRIEF DESCRIPTION OF THE INVENTION

It has surprisingly been found possible to fulfil at least one of these objects by providing expandable microspheres in which the polymer shell is a copolymer of methacrylamide and methacrylonitrile as the main constituents.

One aspect of the invention relates to thermally expandable thermoplastic microspheres comprising a polymer shell made from ethylenically unsaturated monomers encapsulating a propellant, said ethylenically unsaturated monomers comprising from 21 to 80 wt % of methacrylamide and from 20 to 70 wt % methacrylonitrile, the total amount of methacrylamide and methacrylonitrile being from 70 to 100 wt % of the ethylenically unsaturated monomers.

Another aspect of the invention relates to a process for the production of thermally expandable microspheres comprising polymerising ethylenically unsaturated monomers in the presence of a propellant to yield microspheres comprising a polymer shell encapsulating said propellant, said ethylenically unsaturated monomers comprising from 21 to 80 wt % of methacrylamide and from 20 to 70 wt % methacrylonitrile, the total amount of methacrylamide and methacrylonitrile being from 70 to 100 wt % of the ethylenically unsaturated monomers.

Yet another aspect of the invention relates to expanded microspheres obtained by expanding expandable microspheres of the invention.

A further aspect of the invention relates to use of the thermally expandable microspheres of the invention as a foaming agent.

Still a further aspect of the invention relates to an expandable formulation comprising a thermoplastic polymer matrix and expandable microspheres of the invention and the preparation of such a formulation.

These and other aspects will be described in more detail below.

DETAILED DESCRIPTION OF THE INVENTION

The ethylenically unsaturated monomers preferably comprise from 30 to 80 wt %, from 31 to 80 wt %, from 30 to 70 wt %, or from 40 to 60 wt % of methacrylamide. Furthermore, the ethylenically unsaturated monomers preferably comprise from 30 to 65 wt %, from 30 to 60 wt %, or from 40 to 60 wt % methacrylonitrile.

The total amount of methacrylamide and methacrylonitrile may be from 80 to 100 wt %, or 90 or 95 wt %, and up to 100 wt %, of the ethylenically unsaturated monomers.

The weight ratio methacrylonitrile to methacrylamide is preferably from 2.5:1 to 1:2.5, particularly from 1.8:1 to 1:1.8, or from 1.5:1 to 1:1.5.

The ethylenically unsaturated monomers may further comprise one or more crosslinking monomers having at least two polymerizable carbon to carbon double bonds, such as one or more of divinyl benzene, ethylene glycol di(meth)acrylate, di(ethylene glycol) di(meth)acrylate, triethylene glycol di(meth)acrylate, propylene glycol di(meth)acrylate, 1,4-butanediol di(meth)acrylate, 1,6-hexanediol di(meth)acrylate, glycerol di(meth)acrylate, 1,3-butanediol di(meth)acrylate, neopentyl glycol di(meth)acrylate, 1,10-decanediol di(meth)acrylate, pentaerythritol tri(meth)acrylate, pentaerythritol tetra(meth)acrylate, dipentaerythritol hexa(meth)acrylate, triallylformal tri(meth)acrylate, allyl methacrylate, trimethylol propane tri(meth)acrylate, tributanediol di(meth)acrylate, PEG #200 di(meth)acrylate, PEG #400 di(meth)acrylate, PEG #600 di(meth)acrylate, 3-acryloyloxyglycol monoacrylate, triacryl formal, triallyl isocyanate, triallyl isocyanurate etc. Particularly preferred are crosslinking monomers that are at least tri-functional, examples of which include pentaerythritol tri(meth)acrylate, pentaerythritol tetra(meth)acrylate, dipentaerythritol hexa(meth)acrylate, triallylformal tri(meth)acrylate, trimethylol propane tri(meth)acrylate, triacryl formal, triallyl isocyanate and triallyl isocyanurate.

The amounts of crosslinking functional monomers may, for example, be from 0.01 to 3 wt %, or from 0.1 to 1 wt %, or from 0.2 to 0.5 wt % of the ethylenically unsaturated monomers.

The ethylenically unsaturated monomers may be free from or comprise less than 10 wt % of carboxylic acid monomers, for example less than 5 wt %, or less than 2 wt % of carboxylic acid monomers containing monomers, such as methacrylic acid or acrylic acid.

If ethylenically unsaturated monomers having only one carbon to carbon double bond, other than methacrylonitrile and methacrylamide, are included, the amount thereof is preferably from 0 to 10 wt %, most preferably from 0 to 5 wt %, or from 0 to 2 wt %. Examples of such other kinds of monomers that may be included are nitrile containing monomers, such as acrylonitrile, α-ethoxyacrylonitrile, fumaronitrile or crotonitrile; vinyl pyridine; vinyl esters, such as vinyl acetate; styrenes, such as styrene, halogenated styrenes or α-methyl styrene; dienes, such as butadiene, isoprene and chloroprene; unsaturated carboxylic compounds like acrylic acid, methacrylic acid and salts thereof; unsaturated esters, such as methyl acrylate or methyl methacrylate or ethyl acrylate or ethyl methacrylate; unsaturated halogenated compounds, such as vinyl chloride, vinylidene fluoride and vinylidene chloride, or other unsaturated monomers like acrylamide, or N-substituted maleimides.

In an embodiment the ethylenically unsaturated monomers substantially consist of, or consist of, methacrylonitrile and methacrylamide, and at least one crosslinking monomer having at least two carbon to carbon double bonds.

The softening temperature of the polymer shell, normally corresponding to its glass transition temperature ($T_g$), is preferably within the range from 50 to 250° C., or from 100 to 230° C.

Preferably the polymer shell constitutes from 50 to 95 wt % or from 60 to 90 wt % of the total microsphere.

The propellant is normally a liquid having a boiling temperature not higher than the softening temperature of the thermoplastic polymer shell and may comprise hydrocarbons, such as n-pentane, isopentane, neopentane, cyclopentane, cyclohexane, n-butane, isobutane, n-hexane, isohexane, neohexane, n-heptane, isoheptane, n-octane, isooctane, isodecane, isododecane, or mixtures thereof. Aside from them, other hydrocarbon types can also be used, such as petroleum ether, or chlorinated or fluorinated hydrocarbons, such as methyl chloride, methylene chloride, dichloroethane, dichloroethylene, trichloroethane, trichloroethylene, trichlorofluoromethane, perfluorinated hydrocarbons, etc. Particularly preferred propellants comprise at least one of isobutane, isopentane, isohexane, cyclohexane, isooctane, isododecane, and mixtures thereof, preferably isooctane.

The boiling point of the propellant at atmospheric pressure may be within a wide range, preferably from −20 to 200° C., most preferably from −20 to 150° C. It is particularly preferred that the propellant has a boiling point or boiling point range temperature above 50° C., more preferably above 60° C., most preferably above 70° C., but preferably not higher than 150° C., so as to allow evaporation of at least 50 wt %, preferably at least 80 wt %, of the propellant at atmospheric pressure.

In an embodiment, the propellant preferably comprises isooctane, for example in an amount of at least 25 wt %, or at least 50 wt %, preferably at least 60 wt %, or at least 70 wt %, or possibly even substantially consists of isooctane. The propellant may further comprise one or more of butanes, pentanes, hexanes, heptanes, petroleum distillates, isododecane, or other liquids giving a suitable boiling point range of the propellant. Particularly preferred hydrocarbons for use in combination with isooctane are at least one of isobutane, isopentane, isohexane, n-pentane, n-hexane, petroleum ether, isododecane and n-heptane. For example, isooctane can be used together with isopentane, isododecane, or a mixture thereof.

The propellant may, for example constitute from 5 to 50 wt %, or from 10 to 40 wt %, of the total weight of the microspheres.

Apart from the polymer shell and the propellant, the microspheres may comprise further substances added during the production thereof, normally in an amount from 1 to 20 wt %, preferably from 2 to 10 wt %. Examples of such substances are solid suspending agents, such as one or more of silica, chalk, bentonite, colloidal clays, boron nitride, starch, gum agar, modified polysaccharides, for example methyl cellulose, hydroxypropyl methylcellulose, carboxy methylcellulose, starch ethers, starch esters, crosslinked polymers, polymer particles, for example polyamides, polycarbonates, polyethers, polyethylenes, polypropylenes, polystyrene, polyacrylates, and/or one or more salts, oxides or hydroxides of metals like Al, Ca, Mg, Ba, Fe, Zn, Ni and Mn, Ti, for example one or more of calcium phosphate, calcium carbonate, magnesium hydroxide, barium sulphate, calcium oxalate, titanium dioxide, and hydroxides of aluminium, iron, zinc, nickel or manganese. If present, these solid suspending agents are normally mainly located to the outer surface of the polymer shell. However, even if a suspending agent has been added during the production of the microspheres, this may have been washed off at a later stage and could thus be substantially absent from the final product.

Preferably the microspheres of the composition have a comparatively high $T_{start}$ and $T_{max}$. $T_{start}$ is preferably from 130 to 230° C., most preferably from 150, or 180 to 200° C. $T_{max}$ is preferably from 170 to 270° C., most preferably from 200 to 260° C.

The expandable microspheres preferably have a volume median diameter from 1 to 500 μm, more preferably from 5 to 100 μm, most preferably from 10 to 70 μm, as determined by laser light scattering on a Malvern Mastersizer Hydro 2000 SM apparatus on wet samples.

A further aspect of the invention concerns a process for the production of expandable thermoplastic microspheres as described above. The process comprises polymerising ethylenically unsaturated monomers as described above in a preferably aqueous suspension in the presence of a propellant to yield microspheres comprising a polymer shell encapsulating said propellant. Regarding the kinds and amounts of monomers and propellant, the above description of the expandable microspheres is referred to. The production may follow the same principles as described in the earlier mentioned patent publications.

In an embodiment of the invention, the microspheres are produced in a batchwise process and the polymerisation may then be conducted as described below in a reaction vessel. For 100 parts of monomer phase (suitably including monomers and propellant, the proportions of which determine proportions of monomers in the polymer shell and the amount of propellant in the final product), one or more polymerisation initiator, e.g. in an amount from 0.1 to 5 parts, aqueous phase, e.g. in an amount from 100 to 800 parts, and one or more preferably solid colloidal suspending agent, e.g. in an amount from 1 to 20 parts, are mixed and homogenised. The size of the droplets of the monomer phase obtained determines the size of the final expandable microspheres in accordance with the principles described in e.g. U.S. Pat. No. 3,615,972 that can be applied for all similar production methods with various suspending agents. The temperature is suitably maintained from 40 to 90° C., preferably from 50 to 80° C., while the suitable pH depends on the suspending agent used. For example, a high pH, preferably from 5 to 12, most preferably from 6 to 10, is suitable if the suspending agent is selected from salts, oxides, or hydroxides of metals like Ca, Mg, Ba, Zn, Ni and Mn, for example one or more of calcium phosphate, calcium carbonate, magnesium hydroxide, magnesium oxide, barium sulphate, calcium oxalate, and hydroxides of zinc, nickel, or manganese. A low pH, preferably from 1 to 6, most preferably from 3 to 5, is suitable if the suspending agent is selected from starch, methyl cellulose, hydroxypropyl methylcellulose, hydroxypropyl methylcellulose, carboxy methylcellulose, gum agar, silica, colloidal clays, or oxide or hydroxide of aluminium or iron. Each one of the above agents has different optimal pH, depending on, for example, solubility data.

In order to enhance the effect of the suspending agent, it is also possible to add small amounts of one or more promoters, for example from 0.001 to 1 wt %. Usually, such promoters are organic materials and may, for example, be selected from one or more of water-soluble sulfonated polystyrenes, alginates, carboxymethylcellulose, tetramethyl ammonium hydroxide or chloride or water-soluble complex resinous amine condensation products, such as the water-soluble condensation products of diethanolamine and adipic acid, the water-soluble condensation products of ethylene oxide, urea and formaldehyde, polyethylenimine, polyvinylalcohol, polyvinylpyrrolidone, polyvinylamine, amphoteric materials, such as proteinaceous, materials like gelatin, glue, casein, albumin, glutin and the like, non-ionic materials like methoxycellulose, ionic materials normally classed as emulsifiers, such as soaps, alkyl sulfates and sulfonates and long chain quaternary ammonium compounds.

Conventional radical polymerisation may be used and initiators are suitably selected from one or more of organic peroxides, such as dialkyl peroxides, diacyl peroxides, peroxy esters, peroxy dicarbonates, or azo compounds. Suitable initiators include dicetyl peroxydicarbonate, di(4-tert-butylcyclohexyl) peroxydicarbonate, dioctanoyl peroxide, dibenzoyl peroxide, dilauroyl peroxide, didecanoyl peroxide, tert-butyl peracetate, tert-butyl perlaurate, tert-butyl perbenzoate, tert-butyl hydroperoxide, cumene hydroperoxide, cumene ethylperoxide, diisopropylhydroxy dicarboxylate, 2,2'-azobis(2,4-dimethyl valeronitrile), 2,2'-azobis (isobutyronitrile), 1,1'-azobis(cyclohexane-1-carbonitrile), dimethyl 2,2'-azobis(2-methylpropionate), 2,2'-azobis[2-methyl-N-(2-hydroxyethyl)propionamide] and the like. It is also possible to initiate the polymerisation with radiation, such as high energy ionising radiation.

When the polymerisation is essentially complete, microspheres are normally obtained as an aqueous slurry or dispersion, which can be used as such, or dewatered by any conventional means, such as bed filtering, filter pressing, leaf filtering, rotary filtering, belt filtering or centrifuging to obtain a so called wet cake. However, it is also possible to dry the microspheres by any conventional means, such as spray drying, shelf drying, tunnel drying, rotary drying, drum drying, pneumatic drying, turbo shelf drying, disc drying, or fluidised bed-drying.

If appropriate, the microspheres may at any stage be treated to reduce the amount of residual unreacted monomers, for example by any of the procedures described in the earlier mentioned WO 2004/072160 or U.S. Pat. No. 4,287, 308.

The microspheres of the invention are useful as foaming agent in various application, such as for thermoplastic materials and particularly for high melting thermoplastic materials, in injection moulding or extrusion moulding.

One aspect of the invention relates to expanded microspheres obtained by expanding the expandable microspheres as disclosed above for example to a particle diameter from 2 to 5 times larger than the diameter of the unexpanded microspheres. The expansion is effected by heating the expandable microspheres to a temperature above $T_{start}$. The upper temperature limit is set by when the microspheres start collapsing and depends on the exact composition of the polymer shell and the propellant. In most cases a temperature from 100° C. to 250° C. is suitable. The density of the expanded microspheres can be controlled by selecting temperature and time for the heating. The expansion can be effected by any suitable means for heating in any suitable device, as described in e.g. EP 0348372, WO 2004/056549, or WO 2006/009643.

A particular aspect of the invention concerns use of expandable microspheres as described above in an expandable formulation comprising a thermoplastic polymer matrix and expandable microspheres. The formulation optionally further comprise one or more additives like colorants, stabilisers, reinforcements etc. Examples of expandable formulations include mouldable composite sheets and compounds for use in injection moulding, extrusion, blow moulding, rotational moulding, thermoforming, or the like. The amount of expandable microspheres is preferably from 0.5 to 15 wt % or from 1 to 5 wt %. The polymer matrix may, for example, be polypropylene, polystyrene, polyethylene, thermoplastic polyurethanes, polyamides, polycarbonate, polymethyl methacrylate, acrylonitrile-butadiene-styrene co-polymer, styrene-ethylene-butylene-styrene co-polymer, styrene-butadiene-styrene co-polymer, polyvinyl chloride, ethylene-vinylacetate co-polymer or copolymers thereof, or another polymer with similar melting point.

The invention also concerns an expandable formulation as described above comprising a thermoplastic polymer matrix and expandable microspheres as described above and optional further additives as described above.

The invention furthermore concerns a process for its preparation comprising mixing a thermoplastic polymer and expandable microspheres as described above, and optionally further additives as mentioned above, at a temperature above the melting point of the polymer but below the expansion temperature ($T_{start}$) of the microspheres.

EXAMPLES

The invention will be further described in connection with the following Examples which, however, are not to be interpreted to limit the scope of the invention. If not otherwise stated, all parts and percentages refer to parts and percent by weight.

The expansion properties of the microspheres were evaluated on Mettler Toledo TMA/SDTA 841$^e$ using a heating rate of 20° C./minute and a load (net.) of 0.06 N. $T_{start}$ is the temperature at which the expansion starts, $T_{max}$ is the temperature at which maximum expansion is maintained, $D_{min}$ is the density of the microspheres at $T_{max}$, and $\Delta T_{1/2}$ is the width at half height of the thermomechanical analysis curve (TMA curve), in which the probe displacement resulting from the expansion of the microspheres is plotted against the temperature. The higher the number of $\Delta T_{1/2}$, the broader is the expansion window. $F_{300}$ is the ratio between the expansion at 300° C. divided by the maximum expansion, e.g. if $F_{300}$ is 50%, half of the maximum expanded volume is either reached or retained at 300° C. Thermal resistance was further evaluated isothermally at 250° C. and a load (net.) of 0.06 N. Heating was done at 20° C./minute up to 230° C., 10° C./minute up to 240° C., and 5° C./minute up to 250° C., after which the temperature was held at 250° C. for one hour. The thermal resistance is defined as the volume retention of the expanded microspheres, and is presented as the ratio between the expansion after 0, 15, 30, 45, and 60 minutes at 250° C. divided by the maximum expansion reached during the analysis.

The particle size and size distribution was determined by laser light scattering on a Malvern Mastersizer Hydro 2000 SM apparatus on wet samples. The particle size is presented as the volume median diameter D(0.5).

The amount of propellant was determined by thermal gravimetric analysis (TGA) on a Mettler Toledo TGA/SDTA851$^e$. All samples were dried prior to analysis in order to exclude as much moisture as possible, and if present, also residual monomers. The analyses were performed under an atmosphere of nitrogen using a heating rate at 20° C./minute starting at 30° C. In some cases it was difficult to obtain an accurate determination of the amount of propellant since it was difficult to distinguish between weight loss due to loss of propellant and weight loss due to the degradation of the polymer.

Example 1

A reaction mixture containing Mg(OH)$_2$-stabilised organic droplets in water was created by mixing the phases and stirring vigorously until a suitable droplet size had been achieved. The water dispersion contained 4.9 parts of Mg(OH)$_2$ and 370 parts of water. The organic droplets contained 2 parts of dilauroylperoxide, 25 parts of isooctane, 50 parts of methacrylonitrile, 50 parts of methacrylamide, and 0.4 parts of trimethylolpropane trimethacrylate. Polymerisation was performed at 62° C. during 11 hours followed by 4 hours at 80° C., in a sealed reactor under agitation. After cooling to room temperature, a sample of the obtained microsphere slurry was removed for determination of the particle size distribution. After filtration, washing and drying, the particles were analysed by TMA. The dry particles contained about 31% by weight of isooctane and had a median particle size of about 51 μm. The TMA-results are found in Table 1.

Examples 2-11

Microspheres were prepared in a plurality of polymerisation experiments performed as in Example 1, except for the monofunctional monomers (i.e. those having only one carbon to carbon double bond) which were added according to Table 1. Polymerisation was performed as described in Example 1, except for Example 2 in which the polymerisation was performed at 62° C. during 20 hours. Analytical results can be found in Table 1.

TABLE 1

Analytical results for Examples 1-11 and amounts of monomers charged.

| Ex. | M1$^a$ (Parts) | M2$^b$ (Parts) | Size (μm) | Propellant (wt %) | $T_{start}$ (° C.) | $T_{max}$ (° C.) | $D_{min}$ (g/l) | $\Delta T_{1/2}$ (° C.) | $F_{300}$ (%) |
|---|---|---|---|---|---|---|---|---|---|
| 1 | 50 | 50 | 51 | 31 | 201 | 284 | 11.6 | 102 | 96 |
| 2 | 50 | 50 | 64 | 23 | No expansion | | | | |
| 3 | 50 | 50 | 38 | 13 | Poor expansion | | | | |
| 4 | 50 | 50 | 17 | 33 | Poor expansion | | | | |
| 5 | 50 | 50 | 19 | 9 | No expansion | | | | |
| 6 | 50 | 50 | 11 | 13 | No expansion | | | | |
| 7 | 80 | 20 | 28 | 8 | No expansion | | | | |
| 8 | 70 | 30 | 48 | 16 | 130 | 222 | 60.6 | 25 | 13 |
| 9 | 60 | 40 | 52 | 20 | 188 | 225 | 12.8 | 129 | 73 |
| 10 | 40 | 60 | 60 | 28 | 213 | 293 | 27.1 | 90 | 99 |
| 11 | 30 | 70 | 57 | 31 | 226 | 315 | 149 | 83 | 97 |

$^a$M1 is methacrylonitrile (MAN) in examples 1 and 3-11, and acrylonitrile (AN) in example 2.
$^b$M2 is methacrylamide (MAAM) in examples 1, 2 and 7-11, acrylamide in example 3, N-(hydroxymethyl)-acrylamide in example 4, N,N-dimethylacrylamide in example 5, and N-(3-(dimethylamino)propyl)-methacrylamide in example 6.

In Table 1 it can be seen that thermally expandable microspheres with a high $T_{start}$, broad expansion window and excellent volume retention at 300° C., can be achieved when methacrylonitrile and methacrylamide were used as monofunctional monomers, while the microspheres of comparative Examples 2-7 showed no or poor expansion.

Examples 12-16

Microspheres were prepared in a plurality of polymerisation experiments performed as in Example 1, except for propellants which were added according to Table 2. Analytical results can be found in Table 2.

TABLE 2

Analytical results for Examples 12-16 using different propellants.

| Ex. | Propellants$^a$ | Mixture$^b$ (Parts) | Size (μm) | Propellant (wt %) | $T_{start}$ (° C.) | $T_{max}$ (° C.) | $D_{min}$ (g/l) | $\Delta T_{1/2}$ (° C.) | $F_{300}$ (%) |
|---|---|---|---|---|---|---|---|---|---|
| 12 | IP | 100 | 49 | 22 | 195 | 251 | 58.9 | 108 | 89 |
| 13 | IP/IO | 50/50 | 63 | 25 | 189 | 252 | 28.5 | 119 | 91 |
| 14 | IO/ID | 75/25 | 56 | 29 | 204 | 250 | 13.2 | 89 | 62 |

TABLE 2-continued

Analytical results for Examples 12-16 using different propellants.

| Ex. | Propell-ants[a] | Mix-ture[b] (Parts) | Size (μm) | Propell-ant (wt %) | $T_{start}$ (° C.) | $T_{max}$ (° C.) | $D_{min}$ (g/l) | $\Delta T_{1/2}$ (° C.) | $F_{300}$ (%) |
|---|---|---|---|---|---|---|---|---|---|
| 15 | IO/ID | 50/50 | 53 | 31 | 216 | 253 | 12.7 | 91 | 68 |
| 16 | ID | 100 | 60 | 31 | 218 | 237 | 53.0 | 59 | 47 |

[a]The different propellants used are isopentane (IP), isooctane (IO), and isododecane (ID).
[b]The total weight of propellants used in the experiments is the same.

In Table 2 it can be seen that a high $T_{start}$, a broad expansion window, and excellent volume retention at 300° C. was obtained with various hydrocarbon mixtures as propellants.

Examples 17-28

Microspheres were prepared in a plurality of polymerisation experiments performed as in Example 1, except for the monofunctional monomers which were added according to Table 3. Further, in Example 21, 0.5 parts of trimethylolpropane trimethacrylate was used. Polymerisation was performed as described in Example 1, except for Example 21 in which the polymerisation was performed at 62° C. during 20 hours. Analytical results can be found in Table 3.

TABLE 3

Analytical results for Examples 17-28 with MAN/MAAM combined with other monomers (X).

| Ex. | X[a] | MAN/MAAM/X (Parts) | Size (μm) | Propell-ant (wt %) | $T_{start}$ (° C.) | $T_{max}$ (° C.) | $D_{min}$ (g/l) | $\Delta T_{1/2}$ (° C.) | $F_{300}$ (%) |
|---|---|---|---|---|---|---|---|---|---|
| 17 | AN | 49/49/2 | 60 | 28 | 185 | 261 | 10.6 | 82 | 56 |
| 18 | AN | 48/48/4 | 61 | 25 | 196 | 253 | 8.2 | 61 | 12 |
| 19 | AN | 47/47/6 | 58 | 29 | 193 | 239 | 7.4 | 44 | 4 |
| 20 | AN | 45/45/10 | 56 | 20 | 184 | 217 | 13.1 | 26 | 0 |
| 21 | AN | 26/25/49 | 48 | 24 | 164 | 185 | 124 | 25 | N.a.[b] |
| 22 | MA | 49/49/2 | 54 | 29 | 197 | 244 | 13.3 | 87 | 51 |
| 23 | MA | 47.5/47.5/5 | 58 | 29 | 200 | 241 | 11.4 | 49 | 13 |
| 24 | MA | 45/45/10 | 57 | 28 | 189 | 221 | 25.0 | 23 | 0 |
| 25 | MMA | 47.5/47.5/5 | 65 | 31 | 201 | 258 | 10.2 | 93 | 71 |
| 26 | VDC | 49/49/2 | 57 | 29 | 202 | 243 | 12.4 | 97 | 72 |
| 27 | VDC | 47.5/47.5/5 | 49 | 31 | 198 | 243 | 13.4 | 65 | 32 |
| 28 | VDC | 45/45/10 | 34 | 32 | 199 | 242 | 33.0 | 50 | 27 |

[a]AN = acrylonitrile, MA = methyl acrylate, MMA = methyl methacrylate VDC = vinylidene chloride.
[b]Not analyzed, the sample had lost its expansion already at 220° C.

In Table 3 it can be seen that the broad expansion window and volume retention at 300° C. in microspheres with a copolymer shell from methacrylonitrile and methacrylamide are adversely affected by the addition of other monofunctional monomers.

Example 29

Representing the Disclosure of EP 1577359

Microspheres were prepared as in Example 1, except for monomers and propellants, while stabilizing the organic droplets by using a water dispersion of silica instead of Mg(OH)$_2$. The organic droplets consisted of 0.8 parts dilauroylperoxide, 13 parts isohexane, 13 parts isooctane, 40 parts acrylonitrile, 23 parts methacrylonitrile, 30 parts methacrylic acid, 3.5 parts methacrylamide, 3.5 parts styrene and 0.2 parts diethyleneglycol dimethacrylate. The water dispersion was prepared by mixing 244 parts of water, 10 parts of 1 M NaOH, 17 parts of 10% acetic acid, 0.3 parts of Cr(NO$_3$)$_3$, 10 parts of 40% colloidal silica, 0.9 parts of a condensation product of diethanolamine and adipic acid, 1.5 parts of ascorbic acid and 7 parts of Na$_2$SO$_4$. Polymerization was performed at 70° C. during 20 hours. Analytical results can be found in Table 4.

Example 30

Representing the Disclosure of EP 1964903

Microspheres were prepared as in Example 29, except for the organic droplets which consisted of 54 parts of methacrylonitrile, 46 parts of metacrylic acid, 30 parts of isooctane and 2.4 parts of dilauroylperoxide. Polymerization was performed at 60° C. during 15 hours followed by 9 hours at 70° C. Analytical results can be found in Table 4.

Example 31

Representing the Disclosure of EP 1964903

Microspheres were prepared as in Example 30, except for the monomers which consisted of 64 parts of methacrylonitrile and 36 parts of methacrylic acid. Analytical results can be found in Table 4.

TABLE 4

Analytical results for Examples 29-31.

| Example | Size (μm) | Propellant (wt %) | $T_{start}$ (° C.) | $T_{max}$ (° C.) | $D_{min}$ (g/l) | $\Delta T_{1/2}$ (° C.) | $F_{300}$ (%) |
|---|---|---|---|---|---|---|---|
| 29 | 5.6 | 34 | 192 | 202 | 10.8 | 28 | 0 |
| 30 | 9.5 | 25 | 220 | 263 | 31.1 | 88 | 67 |
| 31 | 9.4 | 26 | 219 | 236 | 11.9 | 49 | 11 |

Thermal Resistance

In Table 5 it can be seen that microspheres according to the invention (Examples 1 and 9) with a copolymer shell from methacrylonitrile and methacrylamide have excellent volume retention even after heating at 250° C. for one hour, as compared with Examples according to prior art (Examples 29-31).

TABLE 5

Volume retention of microspheres after heating at 250° C.

| Example | 0 min (%) | 15 min (%) | 30 min (%) | 45 min (%) | 60 min (%) |
|---|---|---|---|---|---|
| 1 | 100 | 99 | 97 | 94 | 91 |
| 9 | 90 | 89 | 89 | 87 | 84 |
| 29 | 20 | 14 | 7 | 4 | 3 |
| 30 | 91 | 68 | 63 | 59 | 56 |
| 31 | 77 | 48 | 41 | 37 | 33 |

The invention claimed is:
1. Thermally expandable thermoplastic microspheres comprising a polymer shell formed by a reaction product of ethylenically unsaturated monomers encapsulating a propellant, said ethylenically unsaturated monomers comprising from 31 to 80 wt % of methacrylamide and from 20 to 70 wt % methacrylonitrile, the total amount of methacrylamide and methacrylonitrile being from 70 to 100 wt % of the ethylenically unsaturated monomers.

2. The microspheres of claim 1, wherein said ethylenically unsaturated monomers comprise from 30 to 60 wt % of methacrylonitrile.

3. The microspheres of claim 1, wherein the total amount of methacrylamide and methacrylonitrile is from 80 to 100 wt % of the ethylenically unsaturated monomers.

4. The microspheres of claim 3, wherein the total amount of methacrylamide and methacrylonitrile is from 90 to 100% of the ethylenically unsaturated monomers.

5. The microspheres of claim 1, wherein said ethylenically unsaturated monomers comprise from 40 to 60 wt % of methacrylamide.

6. The microspheres of claim 1, wherein said ethylenically unsaturated monomers comprise from 40 to 60 wt % of methacrylonitrile.

7. The microspheres of claim 1, wherein said ethylenically unsaturated monomers comprise less than 10 wt % of carboxylic acid containing monomers.

8. The microspheres of claim 1, wherein said propellant comprises a hydrocarbon selected from the group consisting of isobutane, isopentane, isohexane, cyclohexane, isooctane, isododecane, and mixtures thereof, preferably isooctane.

9. The microspheres of claim 8, wherein said propellant comprises from 50 to 100 wt % of isooctane.

10. A process for the production of the thermally expandable microspheres of claim 1, comprising the steps of polymerising ethylenically unsaturated monomers in the presence of a propellant to yield microspheres comprising a polymer shell encapsulating said propellant, said ethylenically unsaturated monomers comprising from 31 to 80 wt % of methacrylamide and from 20 to 70 wt % methacrylonitrile, the total amount of methacrylamide and methacrylonitrile being from 70 to 100 wt % of the ethylenically unsaturated monomers.

11. Expanded microspheres prepared by a process comprising the step of expanding the expandable microspheres of claim 1.

12. An expandable formulation comprising a thermoplastic polymer matrix and the expandable microspheres of claim 1.

13. A foaming agent comprising the thermally expandable microspheres of claim 1.

14. A method of molding polymeric materials comprising the step of combining the thermally expandable microspheres of claim 1 with a molding material.

15. The microspheres of claim 1, wherein said ethylenically unsaturated monomers are free from carboxylic acid containing monomers.

16. The foaming agent of claim 13 comprising an expandable formulation including a thermoplastic polymer matrix and the thermally expandable microsphere.

17. The method of claim 14 comprising an expandable formulation including a thermoplastic matrix and the thermally expandable microsphere.

* * * * *